(12) United States Patent
Van der Klippe

(10) Patent No.: US 6,641,367 B1
(45) Date of Patent: Nov. 4, 2003

(54) WIND ENERGY CONVERSION APPARATUS

(75) Inventor: Frederikus Van der Klippe, Eindhoven (NL)

(73) Assignee: Aerolift Patents B.V. (NL)

( * ) Notice: Subject to any disclaimer, the term of this patent is extended or adjusted under 35 U.S.C. 154(b) by 0 days.

(21) Appl. No.: 10/110,987

(22) PCT Filed: Oct. 20, 2000

(86) PCT No.: PCT/NL00/00759

§ 371 (c)(1),
(2), (4) Date: Aug. 20, 2002

(87) PCT Pub. No.: WO01/34974

PCT Pub. Date: May 17, 2001

(30) Foreign Application Priority Data

Oct. 22, 1999 (NL) .............................. 1013380

(51) Int. Cl.⁷ .............................. F03D 1/02; F03D 1/06
(52) U.S. Cl. .................... 416/99; 416/110; 416/120; 416/123; 416/175; 416/203
(58) Field of Search ............ 415/4.3, 4.5, 60, 415/908; 416/99, 110, 120, 123, 175, 203, DIG. 4; 290/44, 55

(56) References Cited

U.S. PATENT DOCUMENTS

| | | | |
|---|---|---|---|
| 2,159,653 A | * 5/1939 | Carlin | ................ 416/123 |
| 2,183,195 A | 12/1939 | Kane | |
| 4,105,362 A | * 8/1978 | Sforza | ................ 415/2.1 |
| 4,329,115 A | 5/1982 | Kress | |
| 4,509,899 A | * 4/1985 | Frederick | ............ 416/99 |
| 5,151,610 A | * 9/1992 | St-Germain | ........... 290/55 |
| 5,876,181 A | 3/1999 | Shin | |

FOREIGN PATENT DOCUMENTS

GB  2065787 A  7/1981

* cited by examiner

*Primary Examiner*—Ninh H. Nguyen
(74) *Attorney, Agent, or Firm*—Fenwick & West LLP

(57) ABSTRACT

A wind energy conversion apparatus comprising a supporting structure including a number of spokes, which is rotatably journalled on a horizontal main shaft, wherein auxilliary rotors having an at least substantially circular plane of inflow are mounted on the ends of the spokes, wherein each of the auxilliary rotors has a plane of inflow which includes an acute angle with the central axis of the main shaft and which intersects the central axis upstream of the main shaft, and wherein the auxilliary rotors are made up of rotors including rotor blades or of conical bodies having a large apex angle, whose base is directed towards the oncoming wind.

6 Claims, 5 Drawing Sheets

Figure 1:
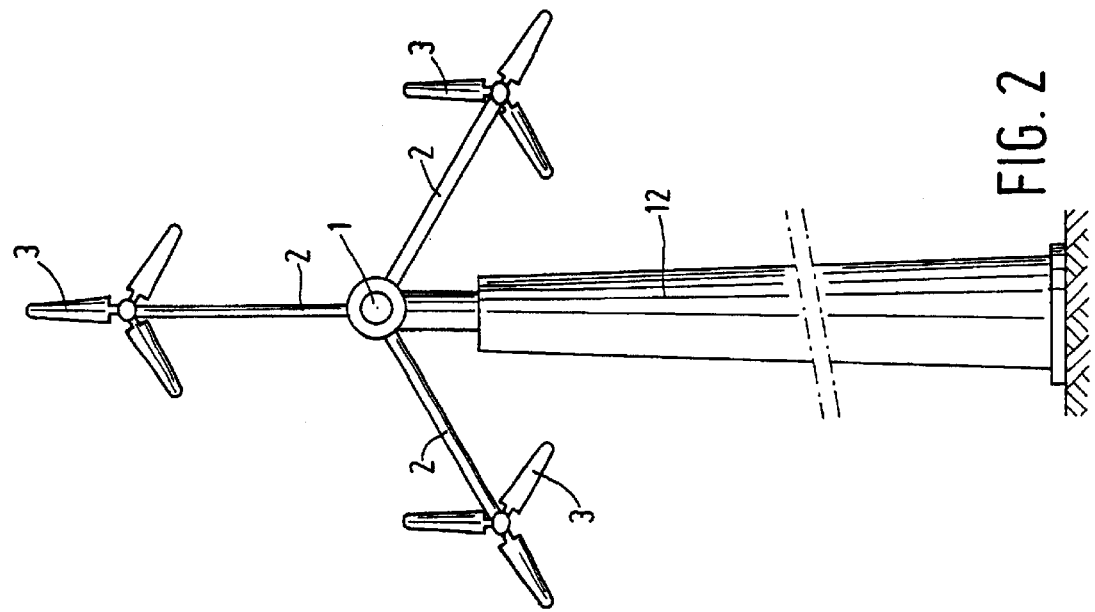

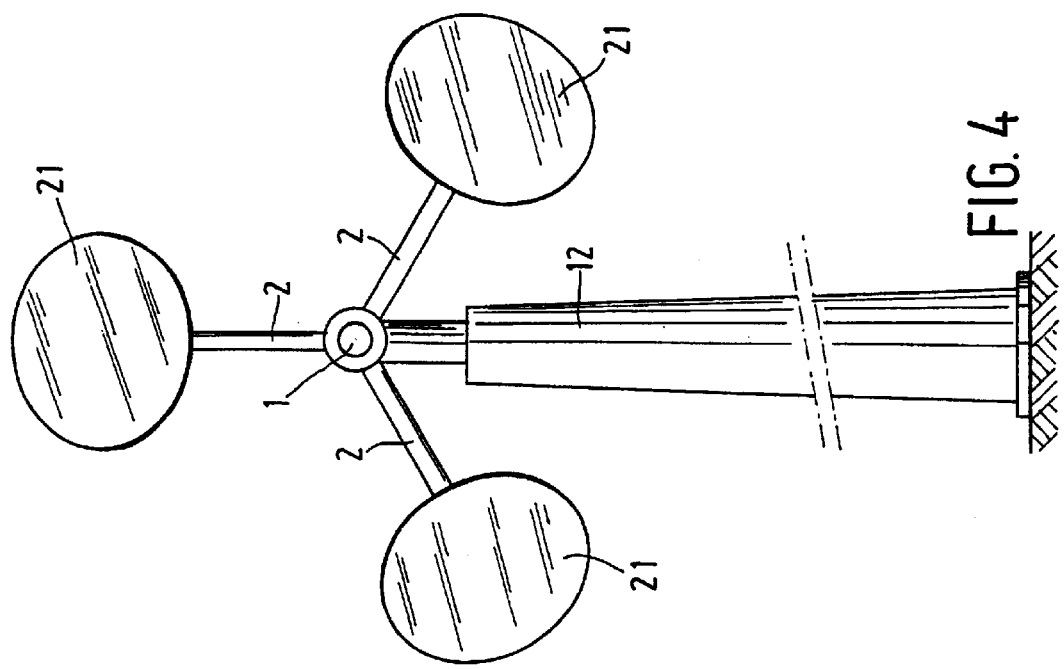
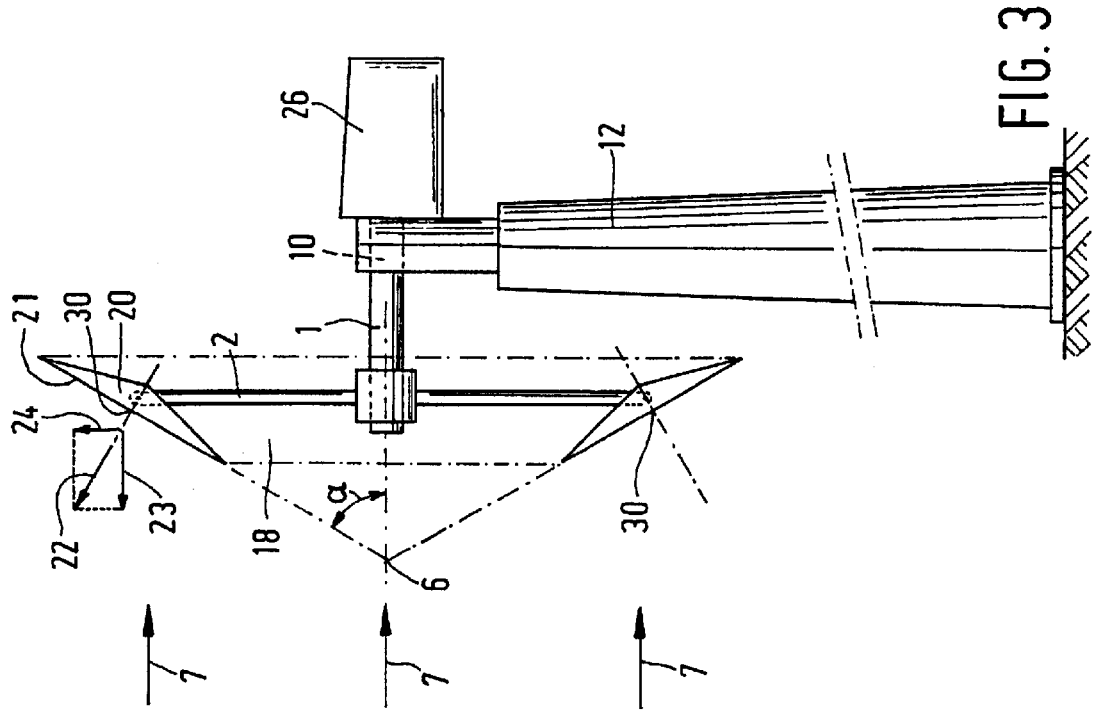

WIND ENERGY CONVERSION APPARATUS

The invention relates to a wind energy conversion apparatus comprising a supporting structure including a number of spokes, which is rotatably journalled on a horizontal main shaft, wherein wind capturing means having an at least substantially circular plane of inflow are mounted on the ends of said spokes.

Wind energy conversion apparatuses of the kind referred to above have been known for quite some time already in the form of the well-known windmills and wind turbines. The wind capturing means that are used thereby are usually in the form of wings or rotor blades, which are rotatable about a horizontal main shaft. The horizontal main shaft thereby extends in the direction of the oncoming wind, all this in such a manner that the plane of inflow of said wind capturing means extends substantially perpendicularly to the main shaft and also substantially perpendicularly to the direction of the oncoming wind.

For a long time already people have attempted to convert an increasing amount of wind energy into other forms of energy. It is known that this can be achieved by enlarging the area that is covered by the wind capturing means. This can be accomplished by using wings or turbine blades having a greater length. The large mechanical forces that act on such long wings or turbine blades place limitations on said length, however.

Another way of enlarging the area covered by the wind capturing means is known from WO 96/00349, FIGS. 10 and 11. Said document discloses a wind turbine comprising a supporting structure (main rotor) including spokes, which is rotatable about a horizontal main shaft and wherein auxiliary rotors are disposed on the ends of said spokes. Said auxiliary rotors, which function as wind capturing means, are thereby so positioned that their plane of inflow extends perpendicularly to the main shaft. A large area is covered with this construction, whilst the length of the rotor blades can be relatively small, so that the mechanical forces that are exerted on said blades can be kept within bounds, especially when, as is also shown, the main rotor and the auxiliary rotors are rotated in opposite directions. The wind capturing means, in this case the auxiliary rotors, of said prior art turbine cover a very large area, as a result of which a large amount of energy is extracted from the oncoming air.

The object of the invention is to improve the aforesaid prior art apparatus and to provide a wind energy conversion apparatus which, given the same dimensions and the same wind conditions, is capable of converting a larger amount of wind energy into other forms of energy.

In order to accomplish that objective the wind energy conversion apparatus according to the invention is characterized in that each of said wind capturing means has a plane of inflow which includes an acute angle with the central axis of the main shaft and which intersects said main shaft upstream.

Surprisingly, said inclined position of the wind capturing means, which, as will be explained in more detail yet, may be made up of rotors including rotor blades, which are disposed on the spokes of the supporting structure, or of conical bodies having a large apex angle, such that their planes of inflow include an acute angle with the central axis of the main shaft of the supporting structure, leads to an increased mass flow passing the wind energy conversion apparatus, which in turn leads to an increased energy output. All this can be traced back to the fact that the inclined position of the wind capturing means creates an underpressure near the main shaft, which leads to a certain contraction of the oncoming wind. As will be explained in more detail yet in the description of the figures, all this leads to a significant increase of the energy output that can be obtained from the oncoming air.

Another embodiment of the wind energy conversion apparatus according to the invention is characterized in that each of the wind capturing means consists of a rotor having at least two rotor blades, wherein each rotor is mounted on a rotor shaft, which is rotatably journalled on the end of an associated spoke in such a manner that the plane in which the rotor blades lie includes an acute angle with the central axis of the main shaft and intersects said main shaft upstream, wherein the rotor shaft of each rotor is coupled with means, such as a generator, for converting rotation energy into electric energy. Also in this embodiment of the apparatus according to the invention the aforesaid effect of contraction of the oncoming air flow will occur, resulting in an increased mass flow through the rotors and thus an increased energy output.

According to another embodiment of the apparatus according to the invention the main shaft of the supporting structure includes means for rotating the same. Said means may consist of an electric motor, which is capable of rotating the supporting structure. In this manner it is not the wind velocity but the electric motor that determines the speed of the main rotor, thus enabling easy protection and control the apparatus.

In another embodiment of the apparatus according to the invention the wind capturing means are conical bodies having a large apex angle, whose base is directed towards the oncoming wind, which conical bodies are connected to the ends of their associated spokes in such a manner that the base of each conical body includes an acute angle with the central axis of the main shaft of the supporting structure, intersecting said central axis upstream of the main shaft. Owing to the inclined position of the bases of the conical bodies relative to the main shaft, an area of lower pressure is created round the main shaft again, resulting in an increased mass flow of the air that passes the conical bodies and consequently in an increased energy output.

Another embodiment of the apparatus according to the invention is characterized in that a number of spokes of the supporting structure carry a rotor and in that a number of spokes have a conical body mounted thereon.

According to the invention the acute angle that the aforesaid wind capturing means include with the central axis of the main shaft is adjustable between 80° and 10°, preferably between 60° and 30°.

The invention will be explained in more detail hereafter with reference to the drawing.

Figure 2:
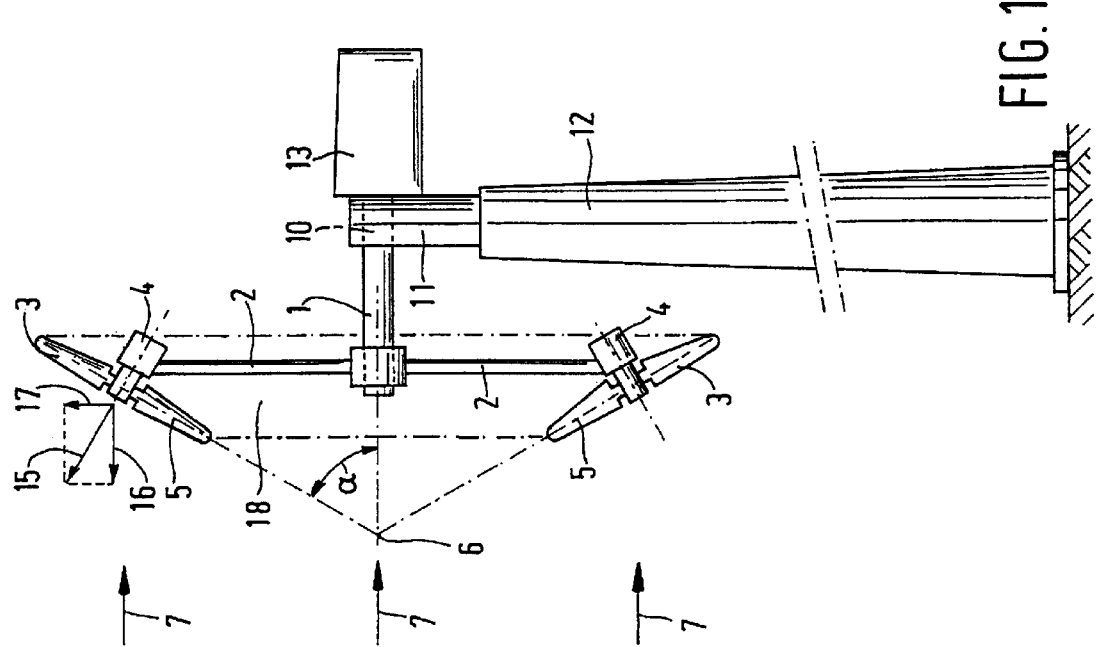

FIGS. 1 and 2 are a schematic side view and a schematic front view, respectively, not to scale, of a wind energy conversion apparatus comprising rotors which are mounted in an inclined position on a supporting structure.

Figure 1A:
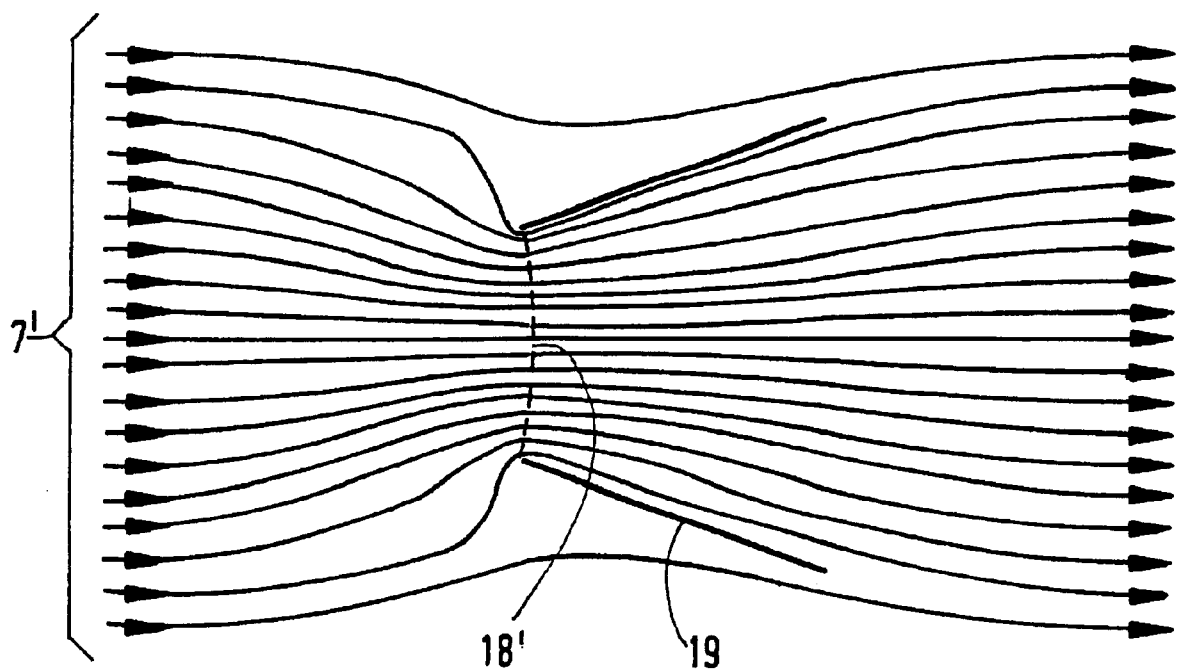

FIG. 1a schematically shows the diverging portion of a well-known venturi tube.

FIGS. 3 and 4 schematically show, not to scale, a wind energy conversion apparatus comprising conical bodies mounted in an inclined position on the spokes of the supporting structure.

Figure 6:
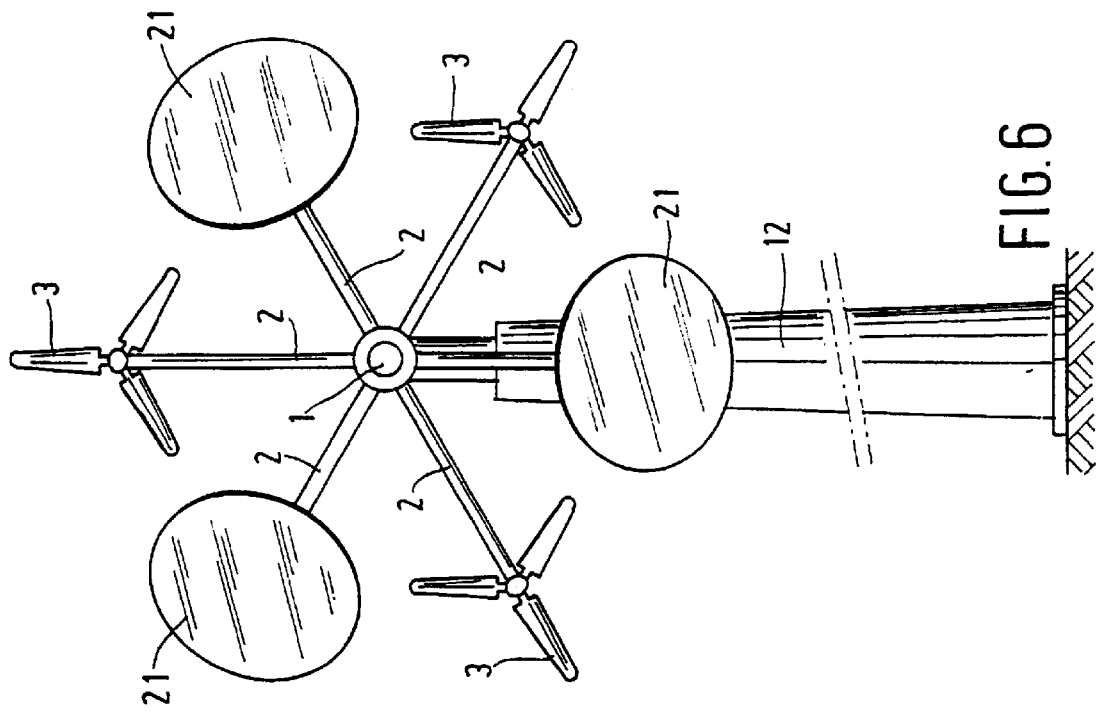
Figure 5:
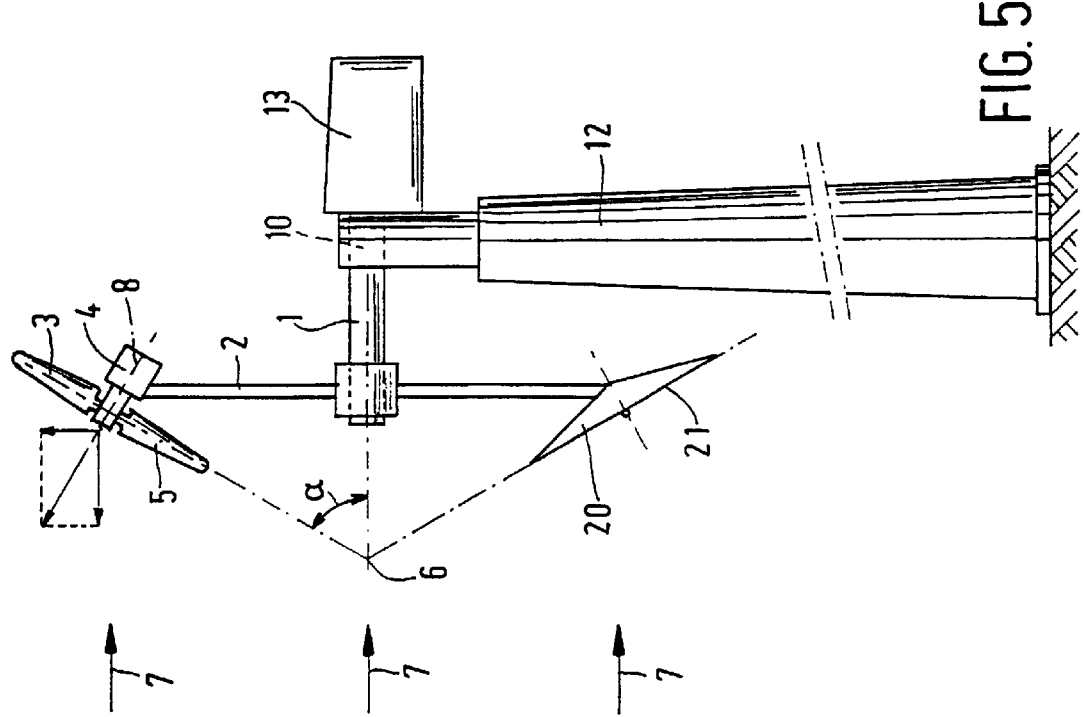

FIGS. 5 and 6 schematically show, not to scale, a wind energy conversion apparatus comprising a supporting structure including a number of spokes, on which rotors and conical bodies are alternately mounted in an inclined position.

Figure 7:
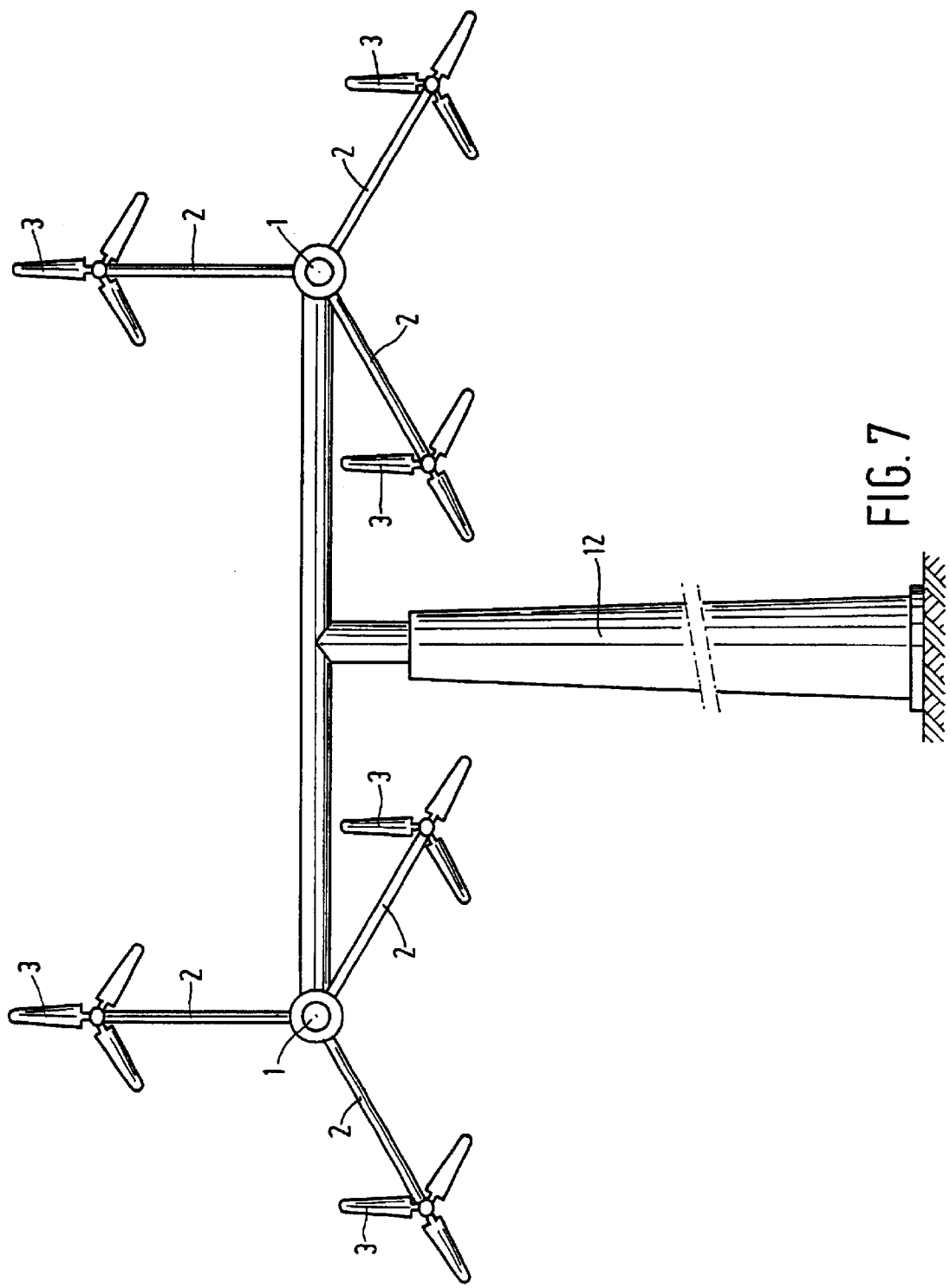

FIG. 7 schematically shows, not to scale, an alternative embodiment of the wind energy conversion apparatus according to the invention.

FIGS. 1 and 2 show a wind energy conversion apparatus comprising a horizontally extending main shaft 1, which carries a supporting structure comprising three spokes 2, on the end of which rotors 3 are mounted, each of which rotors is coupled with a generator 4.

Rotors 3 are mounted on spokes 2 in such a manner that the plane of inflow 5 of said rotors includes an acute angle α with the central axis of the main shaft 1 and that said plane 5 intersects the central axis of the main shaft 1 at a point 6 located upstream, seen in the direction of flow 7 of the oncoming wind. The value of angle a thereby ranges between 80° en 10°, more preferably between 60° and 30°. The main shaft 1 is furthermore supporting in bearings at 10, in a structure 11 which is supported by a tower 12. Main shaft 10 is furthermore coupled to a an electric motor 13, which is capable of rotating the main shaft 1 of the supporting structure under certain circumstances. The oncoming wind 7 will cause rotors 3 to rotate, with the wind reaction force 15 from rotors 3 being perpendicular to plane 5. Said force can thereby be resolved into force 16, which acts parallel to the main shaft 1, and a force 17, which acts in the radial plane of supporting structure 2. As a result of said radial force 17, an underpressure will be generated in the area 18 surrounding the main shaft, and said force 17 will furthermore cause air to be transported in radially outward direction at a downstream location. Owing to the underpressure in area 18, the air flow will be contracted, as a result of which the mass flow through the entire apparatus and through the plane of rotors 3 will increase and more energy can be extracted from the air flow. Said increase in the energy extraction may run up to as much as 40 to 50 percent of the energy that can be extracted with a rotor arrangement wherein the angle α is 90°. This simple measure thus constitutes a major improvement of a wind energy apparatus.

The aforesaid effect of contraction of the oncoming air flow can be compared with that which occurs in the diverging portion of a venturi tube. Said portion 19 is schematically shown in FIG. 1a by way of illustration, whereby the figure furthermore indicates the manner in which an oncoming air flow 7' is subjected to a constriction in the throat 18' of said venturi tube. This well-known effect causes the mass flow through the venturi tube to increase strongly. Surprisingly, it has become apparent that this well-known venturi effect also occurs in the apparatus according to FIGS. 1 and 2, wherein the inclined position of the rotors 3 creates a conical covered surface which acts more or less as a venturi tube, as a result of which the aforesaid effect is obtained.

FIGS. 3 and 4 show a wind energy conversion apparatus wherein conical bodies 20 having a large apex angle rather than rotors are mounted on the spokes 2 of the supporting structure, wherein the base 21 of said conical bodies is directed towards the oncoming wind, said plane of inflow being so inclined as to include an angle α with the central axis of the main shaft 1, intersecting said main shaft upstream. Also in this construction the wind reaction force 22 of the bases 21 can be resolved into a force 23 parallel to the main shaft and a force 24 perpendicularly thereto, which acts in outward direction. As a result of this radially outward force 24 an underpressure will be created again in the area 18 surrounding the main shaft. This will again lead to contraction of the air flow, as a result of which the mass flow of the air that passes the apparatus will increase, and thus also the energy to be extracted from said air flow. All this is again comparable with the venturi effect that occurs in the venturi tube that is shown in FIG. 1a. It will be understood that in addition to being inclined as mentioned above, the cones will also need to be tilted slightly about the line through points 6 and 30, so that a force will be exerted on said cones, which force is in this case directly transmitted via spokes 2 to the main shaft 10, which operates a generator 26 that converts the rotational energy into electric energy.

FIGS. 5 and 6 schematically show a further embodiment of the apparatus according to the invention, wherein rotors 3 and conical bodies 20 are disposed in alternating relationship on the spokes 2 of the supporting structure. The aforesaid effect of creating a certain underpressure in the space surrounding main shaft 1 occurs in this case as well, which again leads to an increased mass flow and an increased conversion of the wind energy into rotational energy.

Also in this case the main shaft 1 is coupled to an electric motor 13, which provides protection and control. It will be understood that the number of rotors 3 and conical bodies 20 may be different from the number shown in the figure.

Although the preceding figures show embodiments wherein a supporting structure 2 comprising rotos 3 or conical bodies 20 are shown to be disposed on tower 12, it may be advantageous under certain circumstances to mount on tower 12 a structure consisting of two supporting structures 2 comprising spokes, which each carry rotors or conical bodies. Such a structure is schematically shown, not to scale, in FIG. 7.

It will be apparent from the foregoing that the invention provides a wind energy conversion apparatus comprising wind capturing means (rotors and conical bodies or a combination thereof), which are so inclined that they will move over the circumferential surface of a truncated cone upon rotation of the supporting structure, resulting in a venturi effect on the air flow. It is important thereby that the inner side of this frustoconical surface forms a practically unimpeded passage for the wind and has a dimension that provides the desired venturi effect. The diameter of the truncated cone on the inflow side is thereby at least substantially half as large as the diameter on the outflow side.

What is claimed is:

1. A wind energy conversion apparatus comprising a supporting structure including a number of spokes (2), which is rotatably journalled on a horizontal main shaft (1), wherein wind capturing means (3) having an at least substantially circular plane (5) are mounted on the ends of said spokes, characterized in that each of said wind capturing means has a plane (5) which includes an acute angle ( ∝) with the central axis of the main shaft (1), such that the wind capturing means move over the circumferential surface of a truncated cone upon rotation of the supporting structure, which acute angle ( ∝) intersects (6) said main shaft upstream and wherein the diameter of the truncated cone on the inflow side is thereby at least substantially half as large as the diameter on the outflow side.

2. A wind energy conversion apparatus according to claim 1, characterized in that each of the wind capturing means consists of a rotor having at least two rotor blades (3), wherein each rotor is mounted on a rotor shaft, which is rotatably journalled on the end of an associated spoke (2) in such a manner that the plane (5) in which the rotor blades lie includes an acute angle ( ∝) with the central axis of the main shaft (1) and intersects (6) said main shaft upstream, wherein the rotor shaft of each rotor is coupled with means (4), such as a generator, for converting rotation energy into electric energy.

3. A wind energy conversion apparatus according to claim 1, characterized in that said wind capturing means are conical bodies (20), whose base (21) is directed towards the oncoming wind (7), which conical bodies are connected to the ends of their associated spokes (2) in such a manner that the base of each conical body includes an acute angle ($\alpha$) with the central axis of the main shaft (1) of the supporting structure, intersecting (6) said main shaft upstream.

4. A wind energy conversion apparatus according to claim 1, characterized in that a number of spokes (2) of the supporting structure carry a rotor (3) and in that a number of spokes have a conical body (20) mounted thereon.

5. A wind energy conversion apparatus according to claim 1, characterized in that the main shaft (1) of the supporting structure comprises means (26) for rotating the same.

6. A wind energy conversion apparatus according to claim 1, characterized in that the acute angle that the aforesaid wind capturing means include with the central axis of the main shaft is adjustable between 80° and 10°.

* * * * *